United States Patent
Qi et al.

(10) Patent No.: US 7,519,136 B2
(45) Date of Patent: Apr. 14, 2009

(54) WIRELESS POSITIONING APPROACH USING TIME DELAY ESTIMATES OF MULTIPATH COMPONENTS

(75) Inventors: Yihong Qi, Yokosuka (JP); Hirohito Suda, Yokosuka (JP); Takahiro Asai, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 566 days.

(21) Appl. No.: 11/147,320

(22) Filed: Jun. 8, 2005

(65) Prior Publication Data

US 2005/0281363 A1    Dec. 22, 2005

(30) Foreign Application Priority Data

Jun. 9, 2004 (JP) .............................. 2004-171819
Sep. 2, 2004 (JP) .............................. 2004-255916

(51) Int. Cl.
H04B 1/10 (2006.01)
H03D 1/04 (2006.01)
H03K 9/00 (2006.01)

(52) U.S. Cl. .................... 375/349; 375/346; 375/316
(58) Field of Classification Search ................. 375/349, 375/346, 316
See application file for complete search history.

(56) References Cited

U.S. PATENT DOCUMENTS

| | | | |
|---|---|---|---|
| 7,068,704 B1* | 6/2006 | Orr | 375/139 |
| 7,116,703 B2* | 10/2006 | Bouillet et al. | 375/148 |
| 7,151,940 B2* | 12/2006 | Diao et al. | 455/456.1 |
| 2003/0125026 A1 | 7/2003 | Tsunehara et al. | |
| 2004/0127228 A1* | 7/2004 | You et al. | 455/456.1 |
| 2005/0159120 A1* | 7/2005 | Garg et al. | 455/132 |

FOREIGN PATENT DOCUMENTS

| | | |
|---|---|---|
| EP | 1 469 685 A1 | 10/2004 |
| JP | 2001-298763 | 10/2001 |
| JP | 2003-194916 | 7/2003 |
| WO | WO 98/14018 | 4/1998 |
| WO | WO 03/025614 A2 | 3/2003 |

OTHER PUBLICATIONS

Li Cong, et al., "Non-Line-of-Sight Error Mitigation in Mobile Location", INFOCOM 2004. Twenty-Third Annual Joint Conference of the IEEE Computer and Communications Societies, vol. 1, XP-010740486, Mar. 7, 2004, pp. 650-659.

(Continued)

*Primary Examiner*—David C Payne
*Assistant Examiner*—Brian J Stevens
(74) *Attorney, Agent, or Firm*—Oblon, Spivak, McClelland, Maier & Neustadt, P.C.

(57) ABSTRACT

A wireless positioning apparatus includes a multipath delay estimator configured to estimate multipath delay components from one or more received signals; a selector configured to select appropriate delay estimates from the estimated multipath delay components according to a predetermined criterion; a storage configured to store an NLOS delay function defining prior statistics of information about non-line-of-sight delays; and a position estimator configured to estimate a position of a mobile station based on the selected delay estimates and the NLOS delay function read out from the storage.

5 Claims, 9 Drawing Sheets

OTHER PUBLICATIONS

Yihong Qi, et al., "On Geolocation Accuracy with Prior Information in Non-line-of-sight Environment", VTC 2002-Fall. 2002 IEEE 56TH. Vehicular Technology Conference Proceedings, vol. 1 of 4, XP-010608563, Sep. 24, 2002, pp. 285-288.

Max Deffenbaugh, et al., "Acoustic Positioning in a Fading Multipath Environment", Proc. MTS/IEEE 'Prospects for the 21$^{st}$ Century' (MTS/IEEE Oceans 1996), vol. 2, Sep. 1996, pp. 596-600.

R.J. Kelly, "Reducing Geometric Dilution of Precision Using Ridge Regression", IEEE Transactions on Aerospace and Electronic Systems, vol. 26, No. 1, Jan. 1990, pp. 154-168.

Joan Borras, et al., "Decision Theoretic Framework for NLOS Identification", Proc. IEEE Vehicular Technology Conference (IEEE VTC 1998 Spring), vol. 2, pp. 1583-1587.

Sinan Gezici, et al., "Non-Parametric Non-Line-of-Sight Identification", Proc. IEEE Vehicular Technology Conference (IEEE VTC 2003 Fall), vol. 4, pp. 2544-2548.

Yihong Qi, et al., "Mitigation of NLOS Effects in TOA Positioning", 35$^{th}$ Annual Conference on Information Sciences and Systems (CISS 2001), The Johns Hopkins University, Mar. 2001, pp. 590-592.

* cited by examiner

WIRELESS POSITIONING APPROACH USING TIME DELAY ESTIMATES OF MULTIPATH COMPONENTS

FIELD OF THE INVENTION

The present invention relates to a wireless positioning technique, and more particularly, to locating the position of a mobile station (MS) by processing the delay estimates of the radio signals that travel between the mobile station (MS) and several base stations (BSs).

BACKGROUND OF THE INVENITON

In a multipath environment, multipath echoes originating from the same transmission signal arrive at a receiving point through different paths due to reflection from a tall building or diffraction by the straight edge or the corner of an obstruction. Accordingly, a received signal contains a direct wave propagating through a straight (the shortest) path, followed by delayed waves arriving slightly after the direct wave. Radio communication that can expect a direct wave is called line-of-sight (LOS) communication because of the straight path between transmission and receiving antennas along a visual line of sight. In contrast, radio communication that cannot expect a direct wave is called Non-line-of-sight (NLOS) communication, in which a transmission antenna cannot see the receiving antenna due to LOS blocks. In NLOS communication, the first arriving wave is also an NLOS delay signal subjected to reflection or diffraction.

Locating positions using radio signals that are susceptible to multipath propagation has been an important issue for wideband mobile communication systems. The conventional approach for performing positioning is based on the delays of first arriving signals only, which approach is to reduce the multipath positioning problem to the conventional single-path model. One of known positioning techniques for locating the position of a mobile station based on first-arrival detection is trilateration (electro-optical distance measuring) that makes use of radio signals transmitted between a base station and the mobile station.

On the other hand, a technique for creating a multipath delay profile from a received signal to improve the positioning accuracy using the delay profile is proposed (by, for example, JP 2001-298763A and JP 2003-194916A). In JP 2001-298763A, delay variance is estimated from the created delay profile, and the positioning accuracy is determined based on the variance. In JP 2003-194916A, interference signals are cancelled using a delay profile, prior to performing trilateration-based position estimation, to improve the positioning accuracy.

Furthermore, for underwater application, an acoustic positioning scheme adapting the full multipath structure of received signals has been proposed. See M. Deffenbaugh, H. Schmidt and J. G. Bellingham, "Acoustic Positioning in a Fading Multipath Environment," Proc. MTS/IEEE 'Prospects for the 21st Century' (MTS/IEEE Oceans 1996), Vol. 2, pp. 596-600, September 1996. The method disclosed in this publication consists of two steps. First, two sets of multipath delay estimates, delay estimates using actual received signals and estimates predicted by a so-called ray tracing model, are produced. Then, the differences between the measured and predicted estimates are used in a linear inversion to obtain a position estimate.

Meanwhile, a signal processing technique is proposed for improving the accuracy performance of a position-fixing navigation system when the geometry of the navigation landmarks (e.g., sensors) is nearly collinear. See R. J. Kelly, "Reducing Geometric Dilution of Precision Using Ridge Regression," IEEE Transactions on Aerospace and Electronic Systems, Vol. 26, No. 1, January 1990. This techniques is irrelevant to use of multipath components contained in a received signal, but discloses a method of modifying the conventional least mean square (LMS) position-fixing algorithm using ridge regression, which method is applied to signal processing when landmarks (transmitters) are in a particular geometry.

The conventional techniques disclosed in the above-described publications have some problems. In JP 2001-298763A and JP 2003-194916A, the delay profile is used only for the purpose of determining the accuracy or reducing interference, and the delay components themselves are not reflected in position estimation, but carry out position estimation based only on the first arriving wave. The ray tracing model used in the underwater application with an acoustic positioning scheme is difficult to apply to mobile communication channels, and cannot achieve optimization.

SUMMARY OF THE INVENTION

The present invention is aimed at providing a wireless positioning scheme which makes use of the delay estimates of both first arriving and the subsequent multipath components in received signals. More particularly, the present invention is to provide accurate position estimation by selecting useful multipath components from a delay profile (containing a first arriving wave and the subsequent multipath delay components).

It is also an object of the invention to provide a position estimation method that can locate the position of a mobile station (MS) with a certain degree of precision even if the mobile station and base stations are in a particular geometry that is generally considered to be unsuitable for position estimation.

The rationale of the present invention lies in the following two considerations:

(1) Intuitively, besides first arriving signals, the second and later arriving signals, which are created due to non-line-of-sight (NLOS) propagation, also carry information regarding the position of interest. Hence, it is reasonable that processing all available multipath components, instead of solely the first arriving ones as in the conventional scheme, may improve the positioning accuracy; and (2) This conjecture is confirmed by our mathematical analysis.

The first arriving wave is a part of multipath signal components that first arrives at a receiving antenna, and it also has a receive delay (time difference) with respect to the time of transmission. In this context, the first arriving signal is treated as a delay wave received first at the receiving antenna. The delay components following the first arriving wave are called the second and the subsequent delay waves.

To perform position estimation using multipath components contained in a received signal, the prior statistics (a priori information) of associated NLOS delays is required. If the first arriving wave is a direct wave, prior information about the second and the subsequent delay waves is required. If the first arriving wave is not a direct wave, prior information about the first arriving wave (which is the first NLOS delay wave) is also required. Such prior information as to non-line-of-sight (NLOS) paths is obtained in advance using some sort of method, and it includes, for example, statistically processed information based on actual measurement or logically determined information using typical environmental models. By using the a priori information (NLOS delay information) in combination with delay estimates of multipath components, the position accuracy is enhanced.

First, in our approach, the prior probability density function (p.d.f.) of non-line-of-sight (NLOS) induced path lengths is obtained as an example of the a priori NLOS delay information. This is unlike the conventional acoustic scheme that requires specific environment knowledge to construct the ray tracing model.

Second, a subset of the delay components satisfying certain criteria is selected, instead of using the full multipath structure. This arrangement can reduce computational complexity.

Third, the position of a target is estimated based on the maximum a posteriori (MAP) estimation to maximize the position probability, utilizing both the selected subset of the delay estimates and the prior information (e.g., probability density function) of the NLOS induced path lengths.

In one aspect of the invention, a wireless positioning apparatus used in a mobile communication system is provided. The wireless positioning apparatus comprises:

(a) a multipath delay estimator configured to estimate multipath delay components from one or more received signals;

(b) a selector that selects appropriate delay estimates from the multipath delay components in accordance with a predetermined criterion;

(c) a storage that stores an NLOS delay function defining prior information about non-line-of-sight delays; and (d) a position estimator that estimates a position of a mobile station based on the selected delay estimates and the NLOS delay function read out from the storage.

With this arrangement, the position of the mobile station can be estimated at high precision, by making use of useful information contained in multipath delay components of the received signal.

In a preferred example, the apparatus further comprises a TDOA data generator configured to create time-difference-of-arrival (TDOA) data based on the selected delay estimates. In this case, the position estimator estimates the position of the mobile station based on the TDOA data, in place of the selected delay estimates.

This arrangement allows accurate position estimation even in a non-synchronous system.

In another preferred example, the apparatus further comprises a second position estimator configured to estimate the position of the mobile station in a reduced dimension when the mobile station and base stations contributing to the current position estimation are in a prescribed geometry.

With this arrangement, the position of the mobile station can be estimated at a certain degree of precision even if the mobile station and the base stations are in a particular layout that generally does not allow position estimation in the convention technique.

In another aspect of the invention, a wireless positioning method is provided. The system includes the steps of:

(a) estimating multipath delay components from each of received signals;

(b) selecting appropriate delay estimates from the multipath delay components so as to conform to a predetermined criterion; and (c) estimating a location of a mobile station based on the TDOA data and an NLOS delay function defining prior statistics of non-line-of-sight delays.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

It is assumed that in a mobile communication system the clocks at base stations (BSs) are synchronized. Depending on whether the clock at a mobile station (MS) is synchronized with those of the BSs, the system can be classified as a synchronous or non-synchronous system. In accordance, the positioning schemes for the two types of systems are presented separately below.

First Embodiment

Figure 1:
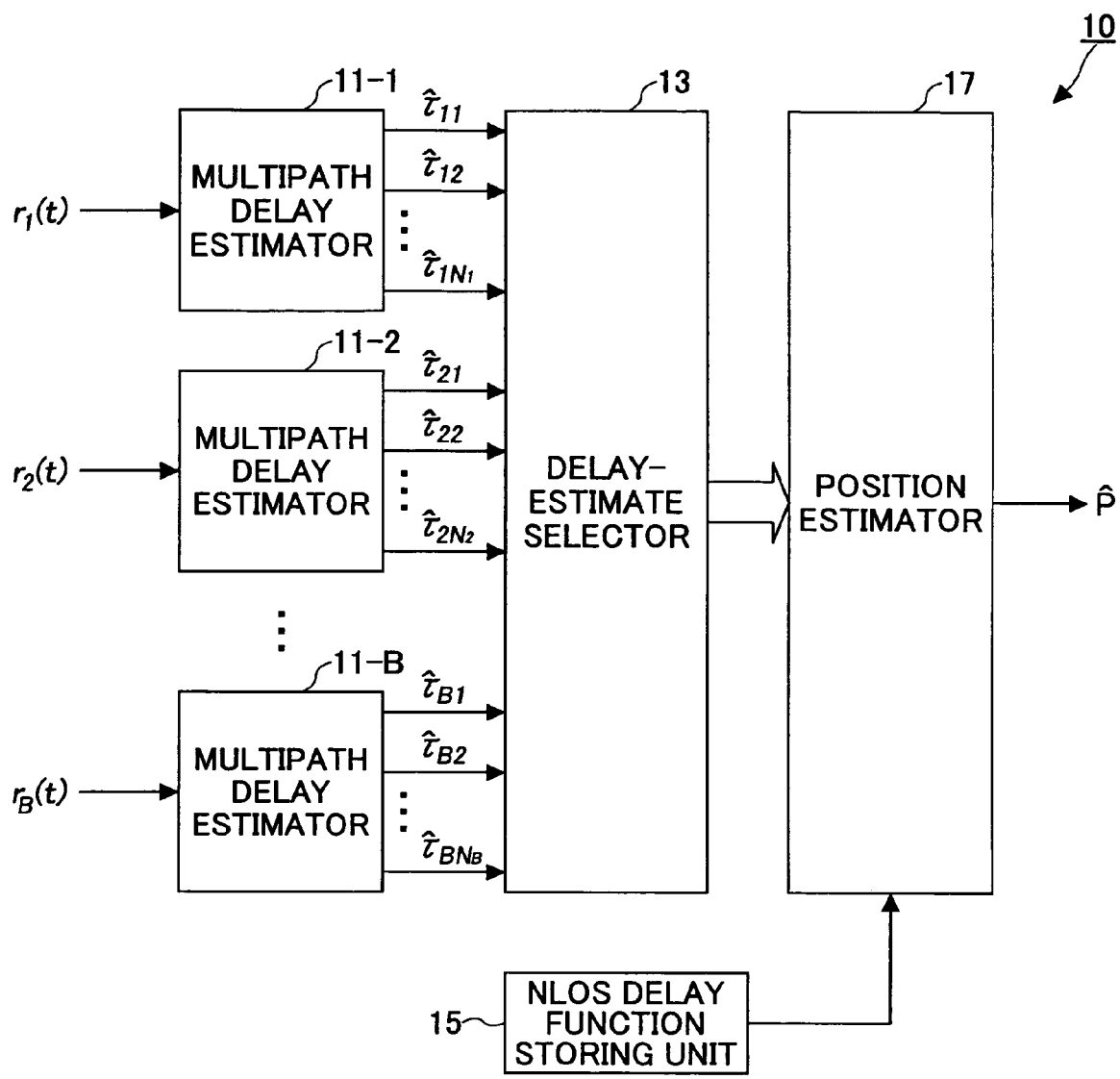
FIG. 1 is a schematic block diagram illustrating a wireless positioning apparatus according to the first embodiment of the invention.

FIG. 1 is a schematic block diagram of a wireless positioning apparatus according to the first embodiment of the invention. In this embodiment, the positioning scheme is applied to a synchronous system. A wireless positioning apparatus 10 includes multipath delay estimators 11-1, 11-2, ..., 11-B that receive signals $r_1(t), r_2(t), \ldots, r_B(t)$, respectively. Each of the multipath delay estimators 11-1 through 11-B is configured to estimate multipath delay components from the associated received signal. The multipath delay estimators 11-1 through 11-B may be treated collectively as a multipath delay estimator 11.

The wireless positioning apparatus 10 also includes a delay-estimate selector 13 (which may be referred to simply as "selector 13") that selects appropriate delay estimates from the multipath delay components according to a predetermined criterion, an NLOS delay function storing unit 15 that stores an NLOS delay function defining prior information about non-line-of-sight delays, and a position estimator 17 that estimates the position of a mobile station (MS) based on the delay estimates selected by the selector 13 and the NLOS delay function read out from the NLOS delay function storing unit 15. The NLOS delay function is a probability density function of path lengths of non-line-of-sight (NLOS) delay paths due to reflection, transmission, or diffraction by buildings or other obstructions.

The wireless positioning apparatus of FIG. 1 may be applied to a mobile station, or to a wireless positioning server (not shown) connected to the base stations. When applied to a mobile station, the mobile station (MS) estimates its location based on signals received from several base stations (BSs), and reports the estimated position to the base stations. When structured as a wireless positioning server, the entire structure of the wireless positioning apparatus 10 may be applied to the wireless positioning server, or alternatively, the multipath delay estimators 11-1 through 11-B may be installed in base stations $BS_1$ through $BS_B$, respectively, while the rest of the part is set in the server. In this embodiment, it is assumed that a radio signal transmitted from a mobile station (MS) is received at several base stations $BS_1$ through $BS_B$, and that received signals are input to the wireless positioning apparatus (or server) 10. In this case, the position $P_b=(x_b, y_b)$ of each base station is known.

Each of the multipath delay estimators 11-1 through 11-B is supplied with one of the received signals $r_1(t)$ through $r_B(t)$ at base stations $BS_1$ through $BS_B$, and estimates multipath delay components $\tau_{bi}$. The index "bi" denotes the delay wave received at the $b^{th}$ base station via the $i^{th}$ path. Delay waves at each BS can be estimated by a known technique, such as an auto-correlation based scheme or a super-resolution PN correlation scheme.

Figure 2:
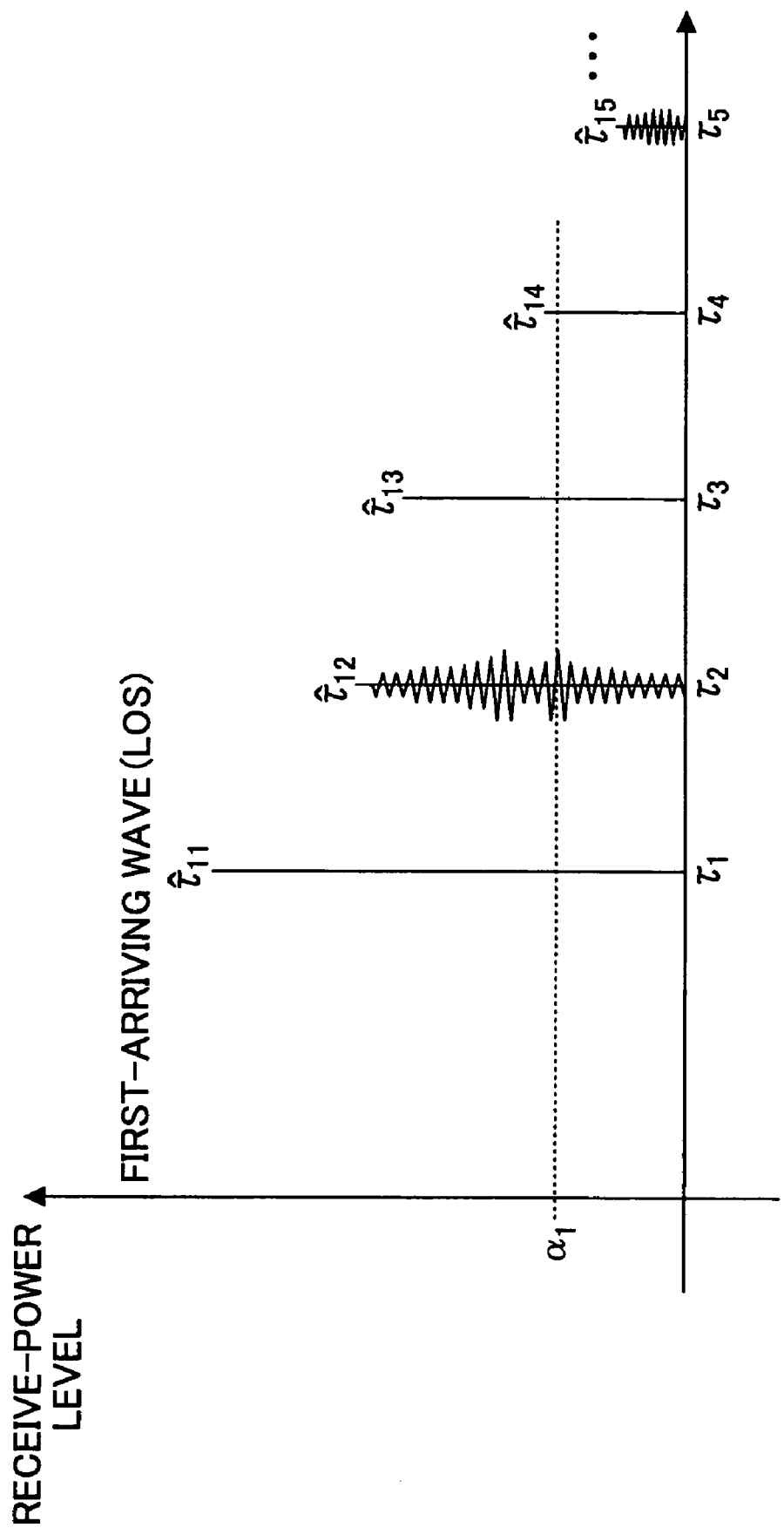
FIG. 2 is a graph illustrating a set of multipath delay waves in a received signal.

FIG. 2 is a graph schematically illustrating a set of multipath delay waves extracted from the received signal $r_1(t)$ of base station $BS_1$. In the example shown in FIG. 2, the first arriving wave is a line-of-sight (LOS) delay wave propagating through a direct path; however, the first arriving wave is not necessarily a LOS delay wave, but is often a non-line-of-sight (NLOS) delay wave subjected to reflection or diffraction. The second and the subsequent delay waves are always NLOS waves. In the multipath delay profile shown in FIG. 2, the second and the fifth NLOS delay waves contain large deviation of delay path lengths.

The received signal $r_b(t)$ at $BS_b$ is $$r_b(t) = \sum_{i=1}^{N_b} A_{bi} \cdot s(t - \tau_{bi}) + n_b(t), \text{ for } b \in B, \quad (1)$$

where $s(t)$ is the signal waveform, $n_b(t)$'s are noise processes, $N_b$ is the number of multipaths to $BS_b$ from the mobile station, $A_{bi}$ and $\tau_{bi}$ are the signal amplitude and time delay corresponding to the $i^{th}$ multipath component in received signal $r_b(t)$, respectively. For a synchronous system, the delay $\tau_{bi}$ is expressed as $$\tau_{bi} = \frac{1}{c}\left\{\sqrt{(x_b - x)^2 + (y_b - y)^2} + l_{bi}\right\}, b \in B \quad (2)$$

where $c=3\times10^8$ m/s is the speed of light, and $l_{bi}$ is the corresponding NLOS propagation induced path length conforming to some known probability density function (p.d.f.). Here the increasing order of $l_{bi}$'s at an arbitrary base station $BS_b$ ($b \in B$) is assumed as $$0 \leq l_{b1} < l_{b2} \ldots < l_{bNb}, \text{ for } b \in B.$$

If $BS_b$ is line-of-sight (LOS) with respect to the MS, the first arriving wave of the received signal propagates through a direct path, and therefore, the delay path length $l_{b1}$ of the 1st path is zero ($l_{b1}=0$).

The multipath delay estimates obtained by a known approach (such as auto-correlation or super-resolution PN correlation) can be approximated as $$\hat{\tau}_{bi} = \tau_{bi} + \xi_{bi}, \text{ for } i=1, 2, \ldots, N_b, \quad (3)$$

where $\xi_{bi}$'s are estimation errors, conforming to Gaussian distribution $N(0, \Psi_b^{-1})$. The approximated multipath delay components are input to the selector 13 from each of the multipath delay estimators 11-1 through 11-B. The entries of the matrix $\Psi_b$ can be shown as $$[\Psi_b]_{ij} = \begin{cases} 8\pi^2 \beta^2 \cdot R_{bi}, & i = j, \\ 2 \cdot \text{Re}\left[\frac{A_{bi} \cdot A_{bj}^*}{N_0} \int \frac{\partial}{\partial \tau_{bi}} s(t - \tau_{bi}) \cdot \frac{\partial}{\partial \tau_{bj}} s^*(t - \tau_{bj}) dt\right], & i \neq j, \end{cases} \quad (4)$$

where $\beta$ is the effective bandwidth of $s(t)$, $R_{bi}$ is the SNR of the $i^{th}$ path component in the received signal $r_b(t)$, and Re[ . . . ] and symbol "*" are the real part and conjugate of some complex value, respectively. For a CDMA system with chip rate W, the off-diagonal entries in Eq. (4) can be expressed as a close-form expression:

$$[\Psi_b]_{ij} = 8\pi^2 \cdot \text{Re} \quad (5)$$
$$\left[\frac{A_{bi} \cdot A_{bj}^*}{N_0}\right] \cdot \left[\frac{W}{k_{b_{ij}}}\sin(k_{b_{ij}}W) + \frac{2}{k_{b_{ij}}^2}\cos(k_{b_{ij}}W) - \frac{2}{k_{b_{ij}}^3 W}\sin(k_{b_{ij}}W)\right].$$

where $k_{bij}=2\pi(\tau_{bi}-\tau_{bj})$.

The selector 13 selects the first arriving wave having propagated through a direct path (LOS delay estimate) and NLOS delay estimate that satisfy prescribed criteria from among the multipath delay estimates supplied from each of multipath delay estimators 11-1 through 11-B. The prescribed criteria include, for example, the signal strength $\alpha$ and the standard deviation $\sigma$ of NLOS induced delay path lengths.

Figure 3:
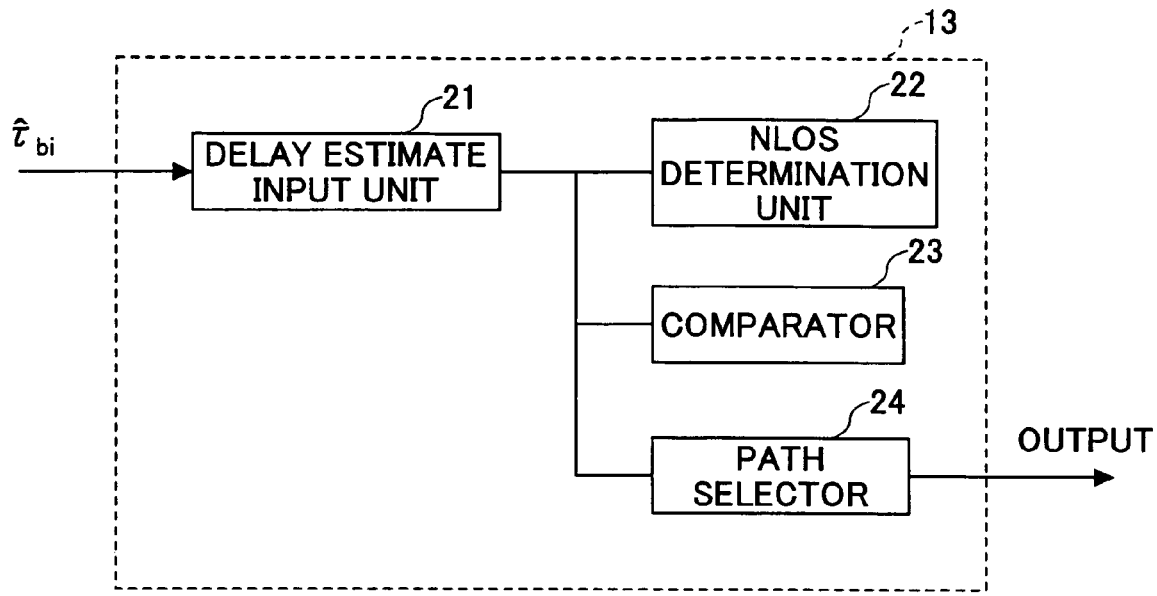
FIG. 3 is a schematic block diagram of the selector used in the wireless positioning apparatus shown in FIG. 1.

FIG. 3 is a schematic block diagram of the selector 13. The selector 13 includes a delay estimate input unit 21 that receives delay estimates determined by the multipath delay estimators 11-1 through 11-B, as well as an NLOS determination unit 22, a comparator 23, and a path selector 24. The NLOS determination unit 22 determines whether the set of multipath delay estimates supplied from each of the multipath delay estimators 11-1 through 11-B consists of NLOS delays only or contains an LOS first arriving wave. The comparator 23 compares the parameters of the NLOS delay estimates, such as the signal strength $\alpha$ and the standard deviation $\sigma$ of the NLOS delay path lengths, with the prescribed reference values. The path selector 24 selects the delay estimate of the LOS first arriving wave determined by the NLOS determination unit 22 and the delay estimates that satisfy the prescribed criteria determined by the comparator 23, and outputs the selected delay estimates to the position estimator 17.

The position estimator 17 reads the NLOS delay function from the NLOS delay function storing unit 15, and estimates the position of the mobile station (MS) using the selected delay estimates supplied from the selector 13 and the NLOS delay function. The NLOS delay function is a probability density function pl(l) obtained statistically in advance with respect to NLOS induced delay path lengths. The position of the MS can be formulated as the maximum a posteriori probability (MAP) estimation. That is, (x, y) and NLOS delay path length l that maximizes the objective function expressed by Eq. (6) are target values.

$$F_{TOA}(x, y, l) = -\sum_{b=1}^{B} (\hat{\tau}_b - \tau_b)^T \cdot \hat{\Psi}_b^{-1} \cdot (\hat{\tau}_b - \tau_b) + \ln p_l(l), \quad (6)$$

where symbol T means transpose. The first term (summation Σ) of the right-hand side of Eq. (6) is determined from the output of the selector 13. The second term of the right-hand side of Eq. (6) is the natural logarithm of the probability density function pl(l) read out of the NLOS delay function storing unit 15.

Figure 4:
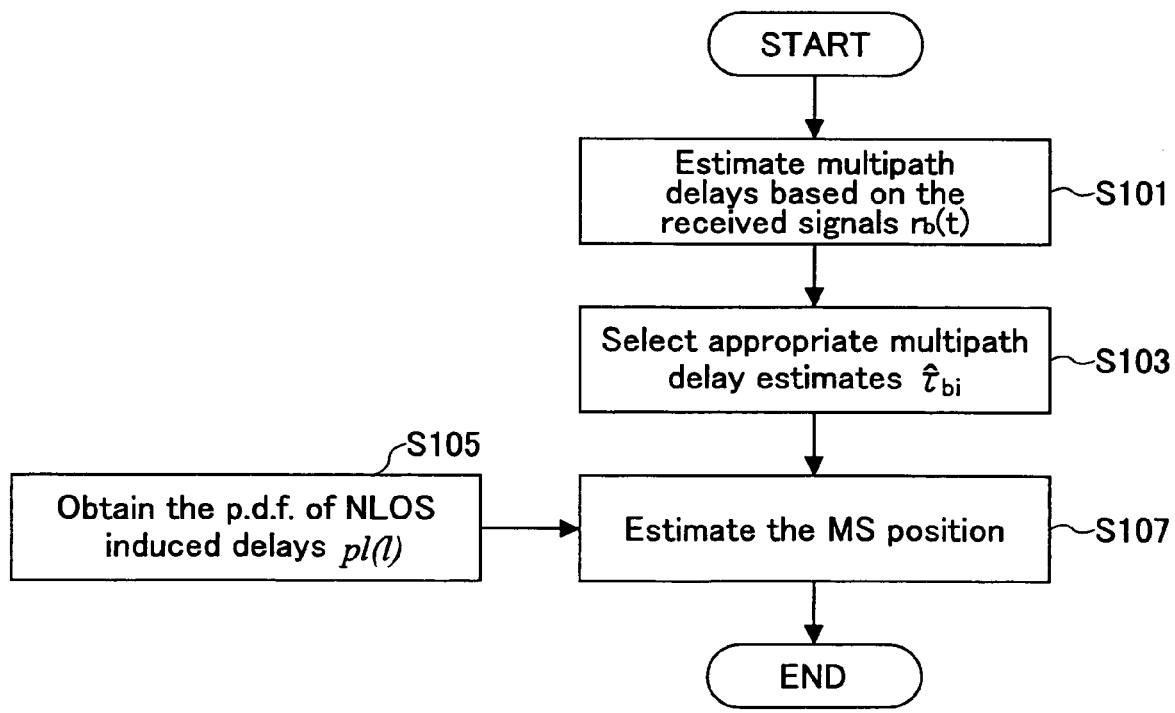
FIG. 4 is a flowchart showing the basic procedure of the wireless positioning method according to the first embodiment of the invention.

FIG. 4 is a flowchart of the operation carried out by the wireless positioning apparatus 10. In step S101, multipath delay components are estimated based on each of received signals $r_b(t)$ using a known method, such as self-correlation or super-resolution PN correlation. Then, in step S103, appropriate multipath delay estimates that satisfy the prescribed criteria are selected from the estimated multipath delay components. In this embodiment, LOS delay components (first arriving delay waves received via direct paths), together with NLOS delay components satisfying the conditions for the signal strength α and the standard deviation σ, are selected, as has been described above.

Figure 5:
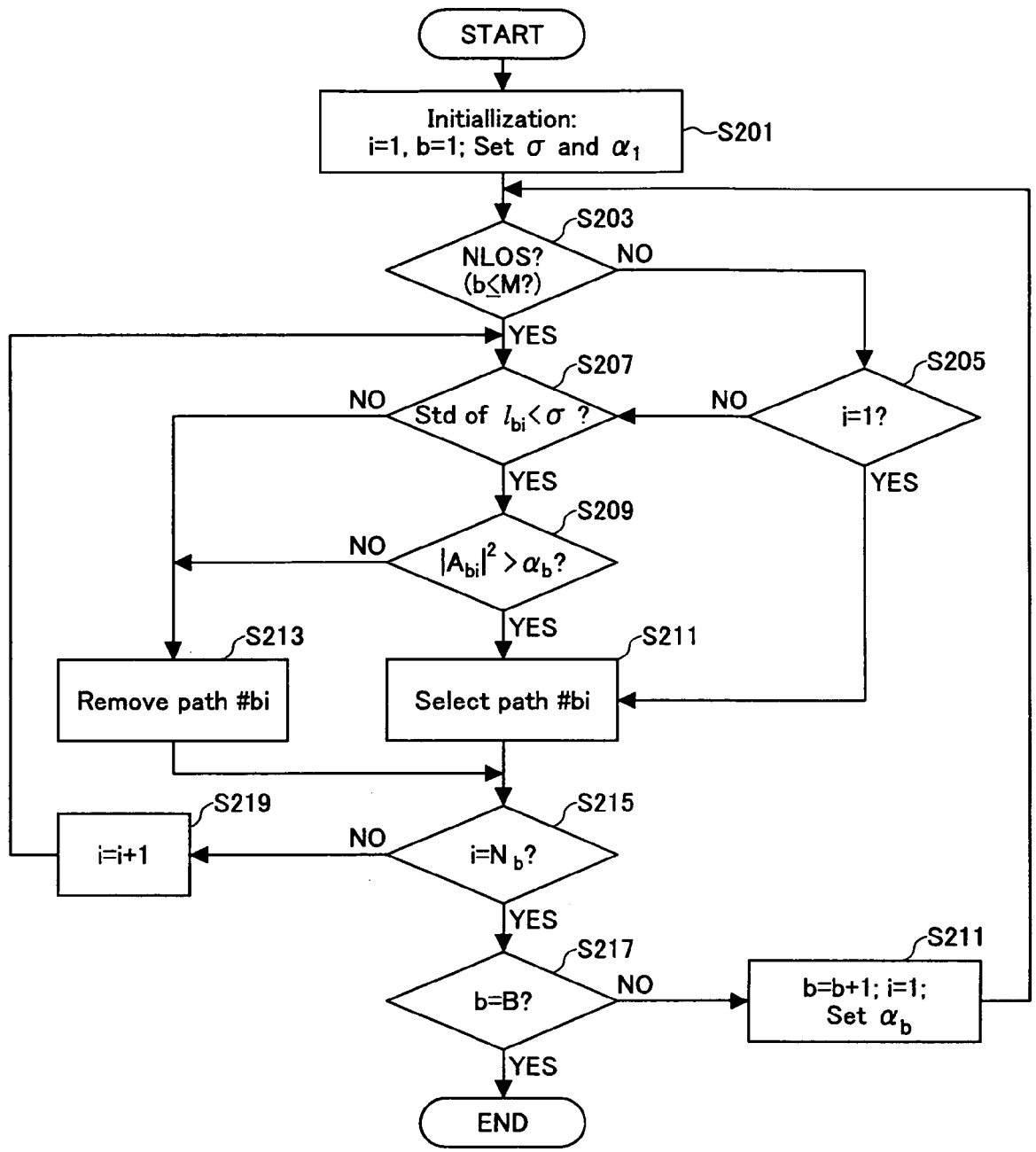
FIG. 5 is a flowchart showing the detailed operation of the delay estimate selection step shown in FIG. 4.

FIG. 5 is a flowchart showing the detailed procedure of step S103. In this example, selection of appropriate multipath delay estimates is performed for the subset of the estimated multipath delays of each of the received signals $r_b(t)$.

First, in step S201, initialization is carried out, that is, the base station number "b" and the path number "i" are set to initial values (b=1 and i=1). In addition, the delay estimate selection criteria for the received signal at $BS_1$ are set. In this example, the reference values of the signal strength $α_1$ and the standard deviation σ of the NLOS induced delay path length $l_{bi}$ are set.

Then, in step S203, it is determined whether the signal received at $BS_b$ (which is $BS_1$ immediately after the initialization) is an NLOS signal, in other words, whether the first arriving wave comes from a non-line-of-sight (NLOS) direct path. Based on the NLOS identification, the currently involved base stations (or signals received from these base stations) are grouped into two.

Let B={1, 2, . . . , B} be the set of indices of all the base stations involved whose locations are known. Denote the set of BSs that do not receive any LOS signals by NL={1, 2, . . . , M}. The complement of NL, denoted by L={M+1, M+2, . . . , B}, is the set of BSs whose first arrivals are LOS signals.

NLOS identification can be performed using a known algorithm disclosed in for example, (1) J. Borras, P. Hatrack and N. B. Mandayam, "Decision Theoretic Framework for NLOS Identification," Proc. IEEE Vehicular Technology Conference (IEEE VTC 1998 Spring), Vol. 2. pp. 1583-1587, Ottawa, Canada, Spring 1998; or (2) S. Gezici, H.Kobayashi and H. V. Poor, "Non-Parametric Non-Line-of-Sight Identification," Proc. IEEE Vehicular Technology Conference (IEEE VTC 2003 Fall), Vol. 4. pp. 2544-2548, Fall 2003. If such identification is not feasible, the first arrivals will be treated as NLOS signals.

NLOS identification may be performed by the selector 13, or alternatively, by each of the multipath delay estimators 11-1 through 11-B. In the latter, each multipath delay estimator 11 adds an identifier representing the NLOS identification result when outputting the set of multipath delay estimates, and the selector 13 groups the base stations based on the identifiers. If the index "b" is less than or equal to M (b≦M), that base station is an NLOS base station.

If it is determined in S203 that the currently processed multipath delay set is derived from an NLOS signal (YES in S203), the process proceeds to step S207 to determine whether the NLOS delay path length $l_{bi}$ of the current path is less than the reference value σ. The delay path length $l_{bi}$ is represented by a random variable conforming to the a priori probability density function. The smaller deviation of the NLOS delay, the more accurate is the information on $l_{bi}$. If the standard deviation of $l_{bi}$ is greater than or equal to σ (NO in S207), the deviation of the NLOS delay path length is larger, which data item is unsuitable for position estimation. In this case, the process proceeds to step S213, and this multipath delay component is removed. On the other hand, if the standard deviation of $l_{bi}$ is less than σ, (YES in S207), the process proceeds to step S209 to determined whether the signal strength $|A_{bi}|^2$ of the current delay component exceeds the reference value $α_b$. If the signal strength exceeds the reference value $α_b$ (YES in S209), then this path is selected in step S211. If the signal strength is insufficient (NO in S209), the delay estimate of this path is unsuitable for position estimation, and therefore this delay component is removed in step S213.

If, in step S203, it is determined that the currently processed data set is not in the NLOS group (NO in S203), the process proceeds to step S205 to determine whether the current path belonging to the LOS group is the first arriving wave (i=1). If the current path is the first arriving wave (YES in S205), this path is received via a direct path, and accordingly the process jumps to S211 to select this path. If this path is not a first arriving one (NO in S205), the currently processed path is an NOLS delay component subjected to reflection, and therefore, parameter comparison based on criteria σ and $α_b$ are performed in steps S207 and S209, respectively. If these criteria are satisfied, the path is selected in S211, and if not, the path is removed in S213.

Then, in step S215, it is determined whether the current path is the last one (i=$N_b$). If not, the "i" is incremented in S219, and the process returns to S207 to repeat S207 through S215. If the process reaches the last path (YES in S215), then it is determined in S217 whether the currently processed base station number "b" is consistent with the total number B of the involved base stations. If b<B, "b" is incremented, "i" is initialized, and α is set to a new value for the next set of the multipath delay estimates in S211. Then, the process returns to step S203 to repeat the process. If b=B in S217, the process terminate because all the sets of multipath delay estimates have been processed.

Taking up the example shown in FIG. 2, the first arriving wave received via an LOS direct path is selected. The second and the fifth components are removed because of large deviations of the NLOS delay path length $l_{bi}$. The third and the fourth delay estimates are selected as long as they have enough strength exceeding $α_1$, with deviations smaller than σ. The parameters α and σ are predetermined positive values selected so as to improve the positioning accuracy.

Returning now to FIG. 4, prior statistical information of the associated NLOS delays (denoted by 1), which are provided in terms of its probability density function pl(l), are read in step S105. Then, in step S107, the parameters x, y, and NLOS delay length l that maximize the objective function of Eq. (6) are determined, based on the selected delay estimates and the NLOS delay function.

In this manner, delay waves useful for position estimation are selected taking into account the signal strength of multipath delay waves ($|A_{bi}|^2$ for $b \in B$ and $1 \leq i \leq N_b$) and deviation of NLOS delay path lengths $l_{bi}$. The smaller the deviation of $l_{bi}$ and the higher the multipath strength, the better is the positioning accuracy expected.

Another advantage of selecting only useful delay waves is that the computational complexity is reduced. The more the base stations that receive the signal from the mobile station, and the more the useful delay waves, the higher is the positioning accuracy expected. However, the accuracy requirement and the computational complexity are trade-off. It is desired to set the reference parameters taking the computational workload and the accuracy improvement into account.

In the path selection process shown in FIG. 5, involved base stations are grouped depending on whether the first arriving wave is received via a LOS direct path, and appropriate delay waves are selected for each base station (that is, for each set of delay estimates). However, the invention is not limited to this example. For example, all the multipath delay estimates input to the selector 13 may be processed collectively by selecting the LOS first arriving waves from among all the delay estimates, and successively performing quality determination on the remaining NLOS delay waves (including NLOS first arriving waves) with respect to the prescribed criteria. In this case, it is desired to provide NLOS identification ability to the selector 13. If it is determined in S203 that the current component is a LOS wave, this path is selected without performing step S205.

Second Embodiment

Figure 6:
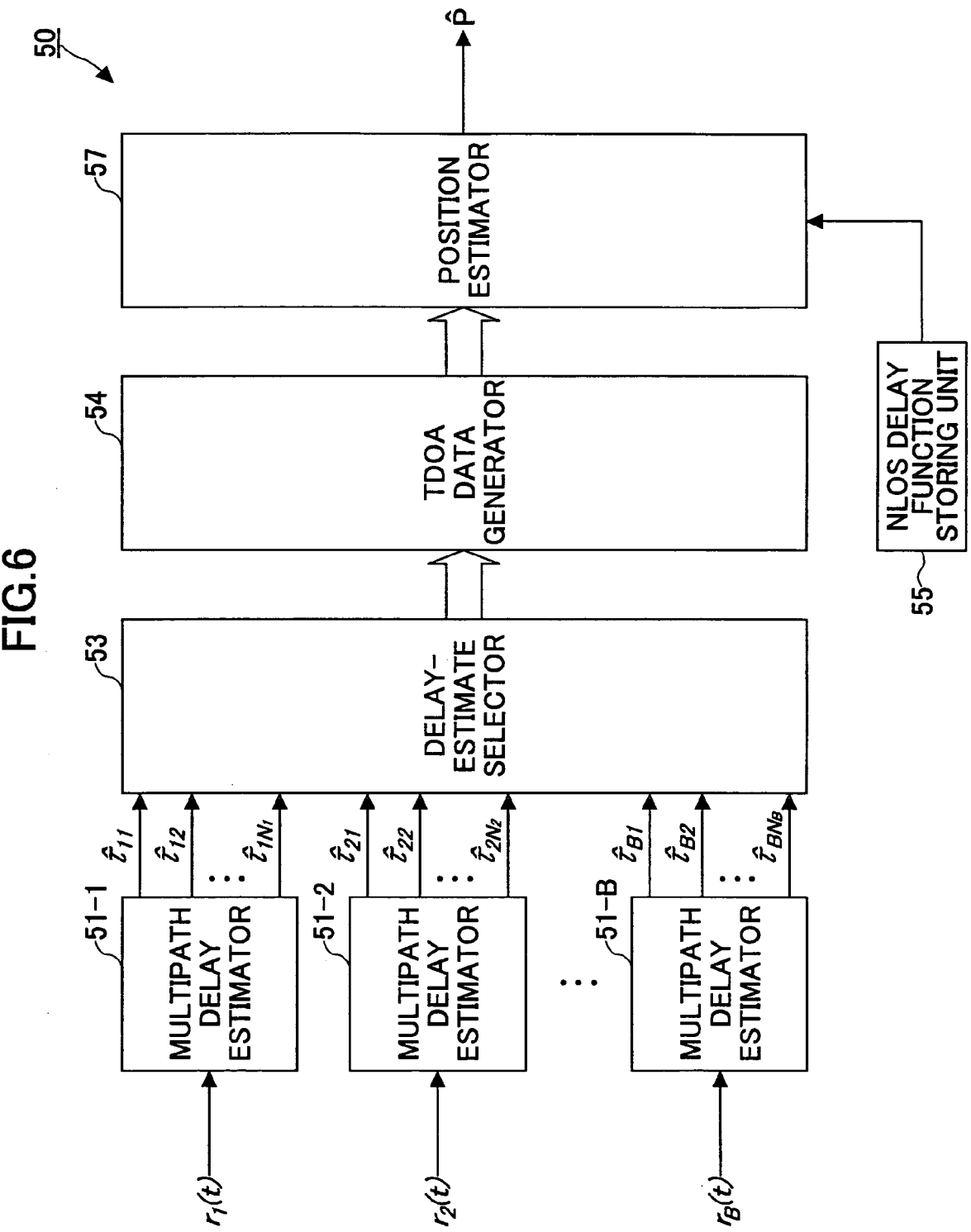
FIG. 6 is a schematic block diagram of a wireless positioning apparatus according to the second embodiment of the invention.
Figure 7:
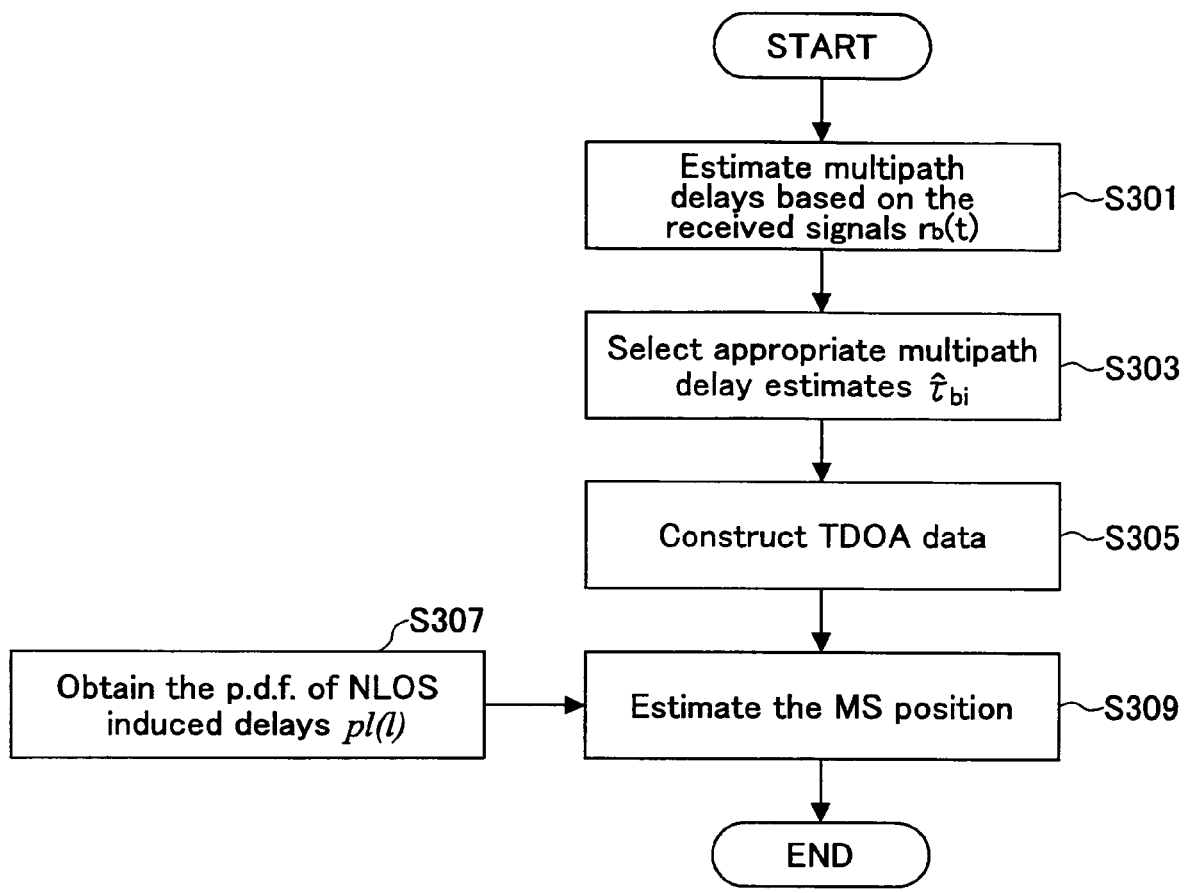
FIG. 7 is a flowchart of a wireless positioning method according to the second embodiment of the invention.

Next, the second embodiment of the present invention is described in conjunction with FIG. 6 and FIG. 7. In the second embodiment, the wireless positioning technique is applied to a non-synchronous system. FIG. 6 is a schematic block diagram of a wireless positioning apparatus 50, and FIG. 7 is a flowchart showing the operation performed by the wireless positioning apparatus 50.

The wireless positioning apparatus 50 includes multipath delay estimators 51-1, 51-2, . . . , 51-B that receive signals $r_1(t), r_2(t), \ldots, r_B(t)$, respectively. Each of the multipath delay estimators 51-1 through 51-B is configured to estimate multipath delay components from the received signal. The wireless positioning apparatus 50 also includes a selector 53 that selects appropriate delay estimates from the multipath delay components according to a predetermined criterion, a TDOA data generator 54 configured to generate time-difference-of-arrival (TDOA) data based on the selected delay estimates, an NLOS delay function storing unit 55 that stores an NLOS delay function defining prior information about non-line-of-sight delays, and a position estimator 57 that estimates the position of a mobile station (MS) based on the TDOA data and the NLOS delay function.

The received signal $r_b(t)$ input to the multipath delay estimator 51-b is expressed by Eq. (1).

In the non-synchronous system, the time delay $\tau_{bi}$ included in Eq. (1) is expressed as $$\tau_{bi} = \frac{1}{c}\left\{\sqrt{(x_b - x)^2 + (y_b - y)^2} + l_0 + l_{bi}\right\}, b \in B \quad (7)$$

where $c=3\times10^8$ m/s is the speed of light, $l_{bi}$ is the corresponding NLOS propagation induced path length, and $l_0/c$ is the unknown time-offset between the clock at the MS and those at the BSs.

The appropriate delay estimates selected by the selector 53 are converted into vector data $\hat{\tau}_b, b \in B$.

The position estimator 57 reads the NLOS delay function from the NLOS delay function storing unit 55, and estimates the position of the mobile station (MS) using the TDOA data and the NLOS delay function. The NLOS delay function is a probability density function pl(l) obtained statistically in advance with respect to NLOS induced delay path lengths. The position of the MS can be formulated as the maximum a posteriori probability (MAP) estimation. That is, (x, y) and NLOS delay path length l that maximizes the objective function expressed by Eq. (8) are target values.

$$F_{TDOA}(x, y, l) = -\sum_{b=1}^{B}\left(\hat{\tau}_b - \tau_b\right)^T \cdot \tilde{\Psi}_b^{-1} \cdot \left(\hat{\tau}_b - \tau_b\right) + \ln p_l(l). \quad (8)$$

where $\tilde{\Psi}_b$ is a covariance matrix of $\hat{\tau}_b$.

FIG. 7 is a flowchart of the wireless positioning method according to the second embodiment of the invention. In step S301, multipath delay components are estimated based on each of received signals $r_b(t)$ using a known method, such as self-correlation or super-resolution PN correlation. Then, in step S303, appropriate multipath delay estimates that satisfy the prescribed criteria are selected. For example, LOS first arriving delay components, as well as NLOS delay components that satisfy the prescribed criteria, are selected, as in the first embodiment. The selection of appropriate delay components may be performed for each set of multipath delay estimates supplied from the associated multipath delay estimator 51, as illustrated in FIG. 5. Alternatively, all the LOS delay components may be selected first, and then, determinations of S207 and S209 may be performed successively on the remaining NLOS delay estimates.

Then, in step S305, TDOA data are generated based on the selected delay estimates. One of the LOS delay estimates selected in S303 is chosen as a reference, and time differences between the reference and the rest of the selected delay estimates are calculated. These time differences are organized into vector $\hat{\tau}_b$, which is used as TDOA data. Then, in step S307, NLOS delay function pl(l) provided in terms of the probability density function of NLOS delay path lengths is read. Finally, in step S309, the parameters x, y, and NLOS delay length l that maximize the objective function of Eq. (8) are determined, based on the TDOA data and the NLOS delay function. Thus, the location of the mobile station is specified.

In this manner, the positioning accuracy is improved even in a non-synchronous system, as compared with the conventional positioning method employed in mobile communication systems. The degree of improvement in positioning accuracy is determined depending on how the reference values of the signal strength $\alpha$ and the standard deviation $\sigma$ of NLOS delay path lengths are set. The higher the multipath strength and the smaller the deviation of $l_{bi}$, the better the positioning accuracy expected.

Third Embodiment

Next, the third embodiment of the present invention is described with reference to FIG. 8 through FIG. 10. In the previous embodiments, the position of the mobile station is estimated based on useful multipath delay components selected from multipath delay profiles of received signals at multiple base stations. This method is based on the premise that there are enough base stations involved in position estimation.

The third embodiment is designed to still allow time-delay based position estimation to a certain degree of accuracy even in unfavorable MS-BS layouts that generally do not allow position estimation using received signals. Such unfavorable MS-BS layouts include a case in which the number of base stations available for position estimation is two or less.

The following two cases in particular MS-BS geometry are observed.

(Case 1)

The signal received at only one base station is available in the two dimensional positioning. In this case, delay estimation, that is, estimation of the MS position is only available in the radial direction of the polar coordinate (r, θ), and estimation of θ is completely unconstrained. The same applies to the case in which received signals at only two base stations are available in the three dimensional space.

(Case 2)

When the MS and all the involved BSs happen to be located on a straight line in a two-dimensional positioning scheme, the positioning is reduced from two dimensional to a one dimensional problem. When the MS and all the involved BSs happen to be located within a plane in a three-dimensional positioning scheme, the positioning is reduced to a two-dimensional problem. When the MS and all the involved BSs happen to be located in a straight line in a three-dimensional positioning scheme, then the positioning is reduced from three-dimensional to a one-dimensional problem.

In general, positioning is formulated as a 2 or 3-dimensional optimization problem. The objective function is constructed based on such criterion as the maximum likelihood estimation (MLE) or the minimum mean square error (MMSE). Then a gradient method or a direct search method is adopted as an optimization tool. See Y. Qi and H. Kobayashi, "Mitigation of non-line-of-sight effects in time-of-arrival positioning," Proc. 35$^{th}$ Annual Conference on Information Sciences and Systems (CISS 2001), The Johns Hopkins University, March 2001, pp. 590-2.

If a two-dimensional estimation scheme is applied as in a general case, a large positioning error would be incurred in the above-described particular cases, producing unsuitable positioning results. This can be confirmed by an analytical result that the corresponding minimum positioning error in terms of the Cramer-Rao Lower Bound (CRLB) would be infinitely large.

It is therefore proposed in the third embodiment to address the reduced dimension problem for the unfavorable MS-BS layouts and to produce a position estimate having a certain degree of accuracy even if the MS and BSs are in a particular geometry unsuitable for position estimation. The proposed technique includes two basic steps: one is to determine whether the current BS-MS configuration should be classified as a reduced dimensional case. The other is to adopt a geolocation scheme in appropriate dimensions.

Prior to explaining the detailed structure of wireless positioning apparatus and method of the third embodiment, the basic idea of the dimension reduced positioning scheme is discussed. It is assumed in the third embodiment that the clocks at base stations (BSs) in a mobile communication system are all synchronized. Depending on whether the clock at an MS is synchronized with those of the BSs, the system can be classified as a synchronous or non-synchronous system. In the ordinary MS-BS layouts, the position of the mobile station is estimated based on the useful delay components selected from the multipath delay profiles of the received signals, as in the first and second embodiments (for the synchronous and non-synchronous systems). The technique described in the third embodiment is applied not only to the uplink communications where the signal transmitted from the mobile station is received at multiple base station, but also to downlink communications where the mobile station receive multiple signals from multiple base stations.

Let B={1, 2, . . . , B} be the set of indices of all the base stations involved, whose locations $\{p_b, b \in B\}$ are known. The MS position, denoted by p' is the parameter to be estimated. Depending on whether it is a one, two or three dimensional problem, p is represented by x, $(xy)^T$, or $(xyz)^T$, respectively, where superscript "T" stands for transpose. The position of the MS may be expressed in polar coordinates instead of Cartesian coordinates. The positions of the base stations $\{p_b, b \in B\}$ are defined in a similar manner. The delay estimate at the $b^{th}$ base station $(BS_b)$ can be approximated as $$\hat{\tau}_b = \tau_b + \xi_b, \text{ for } b \in B, \tag{9}$$

where $\xi_b$' s are estimation errors, conforming to Gaussian distribution N(0, $\sigma_b^2$). The variance $\sigma_b^2$ is related to the system parameters as $$\sigma_b^2 = 1/(4\pi^2 \beta^2 R_b),$$

where $R_b$ and β denote the SNR and the effective bandwidth of the signal received by $BS_b$, respectively. Explicitly, the delay $\tau_b$ for a synchronous system is expressed as $$\tau_b = \frac{1}{c}(\|p - p_b\| + l_b), \tag{10}$$

where c=3×10$^8$ m/s is the speed of light, and ||·|| are Euclidean. On the other hand, the delay $\tau_b$ for a non-synchronous system is expressed as $$\tau_b = \frac{1}{c}(\|p - p_b\| + l_0 + l_b), \tag{11}$$

where $l_0$/c is the unknown time-offset between the clock at the MS and those at the BSs.

If the reduced dimension scenario of an unfavorable MS-BS layout is handled as a normal case using the ordinary positioning technique, the positioning error in terms of the Cramer-Rao Lower bound (CRLB) would be infinitely large. The CRLB sets a lower limit for the variance (or covariance matrix) of any unbiased estimates of an unknown parameter or unknown parameters, as expressed in formula (12).

$$E_p[(\hat{p}-p)(\hat{p}-p)^T] \geq J_p^{-1}, \tag{12}$$

where Jp is the Fisher information matrix (FIM), "A≧B" be interpreted as matrix (A−B) is non-negative definite, and Ep[·] stands for the expectation conditioned on p. The FIM is determined by $$J_p = E_p\left[\frac{\partial}{\partial p}\ln f_p(\hat{\tau}) \cdot \left(\frac{\partial}{\partial p}\ln f_p(\hat{\tau})\right)^T\right], \quad (13)$$

where $$f_p(\hat{\tau}) \propto \prod_{b=1}^{B} \exp\left\{-\frac{1}{2\sigma_b^2}(\hat{\tau}_b - \tau_b)^2\right\}, \quad (14)$$

$$\hat{\tau} = (\tau_1, \tau_2, \dots, \tau_B)^T$$

is the joint probability density function (p.d.f.) of the delay estimates of the base stations with respect to the MS position p.

The matrix Jp is can also be shown as $$J_p = H \cdot \Lambda \cdot H^T, \quad (15)$$

where $$H = \begin{pmatrix} \cos\phi_1 & \cos\phi_2 & \cdots & \cos\phi_B \\ \sin\phi_1 & \sin\phi_2 & \cdots & \sin\phi_B \end{pmatrix},$$

and $$\Lambda = diag(\overline{\sigma_1^2}, \overline{\sigma_2^2}, \dots, \overline{\sigma_B^2}).$$

The angle $\phi_b$ is determined by $$\phi_b = \tan^{-1}[(y-y_b)/(x-x_b)].$$

It can be shown that the minimum mean square error (MMSE) would become infinitely large for the following two BS-MS layouts:
(1) There is only one BS involved, i.e., B=1; and
(2) All the BSs and MS are located on a straight line, i.e., $\phi_i - \phi_j = 0, \pi$ for all i≠j.

On the other hand, if the above two layouts are treated in an appropriate dimensional setting, finite positioning error can be obtained. The position estimation for the above-described particular geometry with finite error is described in more detail below, exemplifying a two dimensional layout.

(1) Case 1: Scenario of Single BS

When there is only one BS, say $BS_1$, then only one delay estimate $\hat{\tau}_1$ is available. In this case, the MS is located on the circle (to be more precise, in the annular region taking the error into account) with radius $\hat{\rho} = \hat{\tau}_1$ and center $(x_1, y_1)$. In this case, the expectation value of the mean square error (MSE) can be derived as $$[E_p(p-\hat{p})^2] = \frac{1}{2\pi\sqrt{2\pi}\,\sigma_1}\int\int\left[(\hat{\rho}\cos\hat{\theta}-x)^2 + (\hat{\rho}\sin\hat{\theta}-y)^2\right] \quad (16)$$

$$\exp\left\{-\frac{1}{2\sigma_1^2}(\hat{\rho}-\tau_1)^2\right\}d\hat{\rho}d\hat{\theta}$$

$$= \frac{1}{\sqrt{2\pi}\,\sigma_1}\int_0^\infty [\hat{\rho}^2 + \tau_1^2]\exp\left\{-\frac{1}{2\sigma_1^2}(\hat{\rho}-\tau_1)^2\right\}d\hat{\rho}$$

$$\left(\text{using }\int_0^{2\pi}\cos\hat{\theta}d\hat{\theta} = \int_0^{2\pi}\sin\hat{\theta}d\hat{\theta} = 0\right)$$

-continued $$\approx \frac{1}{\sqrt{2\pi}\,\sigma_1}\int_{-\infty}^\infty [\hat{\rho}^2 + \tau_1^2]\exp\left\{-\frac{1}{2\sigma_1^2}(\hat{\rho}-\tau_1)^2\right\}d\hat{\rho}$$

(assuming $\tau_1 \gg \sigma_1$)

$$= 2\tau_1^2 + \sigma_1^2 < \infty,$$

where the radius $\hat{\rho}$ is a Gaussian random variable with $N(\tau_1, \sigma_1^2)$, and angle $\hat{\theta}$ is uniformly distributed within $[0,\pi)$. In Eq. (16), when the variance $\sigma_1$ is sufficiently small in comparison with $\tau_1$, the mean square error (MSE) takes a finite value.

In this manner, even if two-dimensional positioning is performed in a particular geometry with a mobile station and a single base station involved, position estimation for the mobile station is still available with a finite error by using Eq. (16), unlike the conventional method deriving infinitely large error. This finite value represents the certainty or likelihood of position estimation. If the calculated finite error is sufficiently small, the resultant position estimate is acceptable as an information item indicating the location of the mobile station even if it is defined only by the radial distance. Accordingly, by setting an appropriate threshold, the location of the mobile station can be specified at a certain degree of accuracy even if the delay estimate is obtained from only one base station.

The parameter in the remaining dimension (e.g., e for two-dimensional positioning) can be randomly selected within the feasible region, excluding infeasible areas or directions, such as at sea where no transportation means are available.

Since the above-described example is on the basis of the two-dimensional positioning scheme, the number of base stations involved is one in Case 1. If applied to three-dimensional positioning, the case where the delay estimates can be obtained for only two BSs corresponds to Case 1.

(2) Case 2: Scenario of All BSs and MS on Straight Line

For two-dimensional positioning, when the involved BSs and the MS line up on a straight line, the positioning problem is essentially a one-dimension problem. Accordingly, the delay estimates given in Eq. (9) can be modified as $$\hat{\tau}_b = \chi - \chi_b + n_b, \text{ for } b \in B, \quad (17)$$

where $x_b$ and x are the positions of $BS_b$ and the MS, respectively; delay estimates $\hat{\tau}_b$ can be either positive or negative. (Assume that estimation error $n_b$ is small enough to determine the sign of delay estimates.) The maximum likelihood estimate of the MS position can be shown as a weighted sum $$\hat{x} = \sum w_b \cdot (\hat{\tau}_b + x_b), \text{ with } w_b = \frac{1/\sigma_b^2}{\sum_{i=1}^{B} 1/\sigma_i^2}. \quad (18)$$

The corresponding MSE is $$var(\hat{x}) = \sum w_b^2 \cdot var(\hat{\tau}_b) = \frac{1}{\sum_{b=1}^{B} 1/\sigma_b^2} < \infty, \quad (19)$$

which is also finite.

Position estimation represented by Eq. (18) is applied to the case where the BSs and the MS are in line-of-sight (LOS). If BSs and the MS are in non-line-of-sight (NLOS) even if they line up, position estimation is performed using the MAP method based on selected (useful) multipath delay components, as described in the first and second embodiments.

For three-dimensional positioning, the BS-MS configuration in which the mobile station and three or more base stations are on a plane or a straight line corresponds to above-described Case 2.

Next, two specific scenarios of the three-dimensional counterpart of Case 1 are discussed below. The two counterpart scenarios include the single-BS case and two-BS case for three-dimensional positioning, and explanation is made of each of the scenarios below.

(3) Case 1-1 for 3-Dimensional Positioning

Only $BS_1$ is available. The spherical coordinate system with the origin at the BS location is adopted for simplicity. Let the true MS position be $(\rho, \theta, \phi)^T$. It is estimated to be on the surface of a sphere with radius of $\hat{\rho}=\hat{\tau}_1$ such that $\hat{\theta}$ and $\hat{\phi}$ are uniformly distributed within $[0, \pi)$ and $[0, 2\pi)$ respectively. The MSE is derived as $$E\|\hat{p}-p\|^2 = \frac{1}{2^{3/2}\pi^{5/2}\sigma} \int_{-\infty}^{+\infty}\int_0^{\pi}\int_0^{2\pi} [(\hat{\rho}\cos\hat{\theta}-\rho\cos\theta)^2 + \qquad (20)$$

$$(\hat{\rho}\sin\hat{\theta}\cos\hat{\psi}-\rho\sin\theta\cos\psi)^2 +$$

$$(\hat{\rho}\sin\hat{\theta}\sin\hat{\psi}-\rho\sin\theta\sin\psi)^2]$$

$$\exp\left\{-\frac{1}{2\sigma_1^2}(\hat{\rho}-\tau_1)^2\right\}d\hat{\psi}d\hat{\theta}d\hat{\rho}$$

$$= \sigma_1^2 + 2\tau_1^2$$

(4) Case 1-2 for 3-Dimensional Positioning

When two base stations, BS1 and BS2, are available, the solution in two-dimensional setting is first reviewed. Let the coordinates of the two BSs be (x1, 0) and (x2, 0), and the true MS position be $(x, y)^T$. The position estimate for the MS is $$(\hat{x}\ \hat{y})^T$$

conforming to the joint Gaussian probability density function (p.d.f.) of $$p_p(\hat{p}) = \frac{|Jp|^{1/2}}{2\pi}\exp\left\{-\frac{1}{2}(\hat{p}-p)^T Jp(\hat{p}-p)\right\}, \qquad (21)$$

where Jp is given by Eq. (15).

Now re-formulate the problem in three dimensions using the cylindrical coordinate with x→z and y→ρ. The position estimate is then set to be $$(\hat{\rho}\ \hat{\psi}\ \hat{z})^T \text{ with } \hat{\rho}=\hat{y}, \hat{z}=\hat{x}$$

and $\hat{\psi}$ is uniformly distributed in $[0, 2\pi)$. It can be shown that the MSE is $$E\|\hat{p}-p\|^2 = \frac{1}{2\pi}\int_{-\infty}^{+\infty}\int_0^{+\infty}\int_0^{2\pi} [(\hat{\rho}\cos\hat{\psi}-\rho\cos\psi)^2 + \qquad (22)$$

$$(\hat{\rho}\sin\hat{\psi}-\rho\sin\psi)^2 + (\hat{z}-z)^2]\cdot$$

$$p_p(\hat{p})d\hat{\psi}d\hat{\rho}d\hat{z}$$

$$= \sigma_x^2 + \sigma_y^2 + 2y^2,$$

where $$\sigma_x^2 = [J_p^{-1}]_{11}, \text{ and } \sigma_y^2 = [J_p^{-1}]_{22}$$

and $[A]_{nn}$ of the right-hand side is the $n^{th}$ diagonal term of matrix A.

Figure 8:
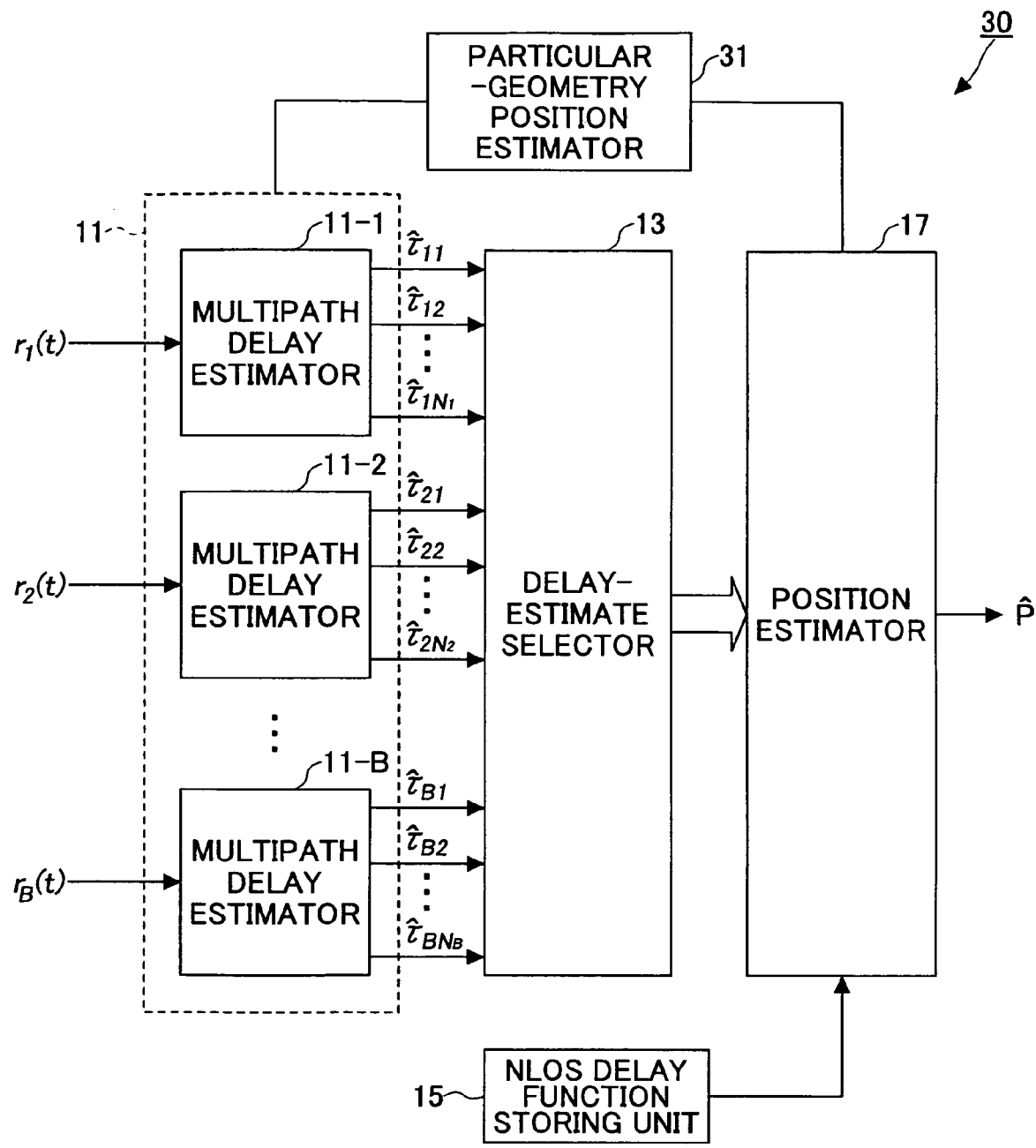
FIG. 8 is a schematic block diagram of a wireless positioning apparatus according to the third embodiment of the invention.

FIG. 8 is a schematic block diagram of a wireless positioning apparatus 30 according to the third embodiment of the invention. The wireless positioning apparatus 30 includes a particular-geometry position estimator 31 configured to perform position estimation in reduced dimensions when the BS-MS layout is in a particular geometry, in addition to multipath delay estimators 11-1 through 11-B, a selector 13, an NLOS delay function storing unit 15, and a position estimator 17. The multipath delay estimator 11 receives one or more received signals, and produces multipath delay estimates for each of the received signals. The selector 13 selects appropriate delay estimates from among the multipath delay estimates produced by the multipath delay estimators 11-1 through 11-B (which may be collectively referred to as a multipath delay estimator 11). The position estimator 17 estimates the location of the MS based on the selected delay estimates supplied from the selector 13 and the NLOS delay function (p.d.f. of delay path lengths) supplied from the NLOS delay function storing unit 15. The wireless positioning apparatus 30 is applied to a synchronous system in the example shown in FIG. 8; however, it may be applied to a non-synchronous system as shown in FIG. 6.

Figure 9:
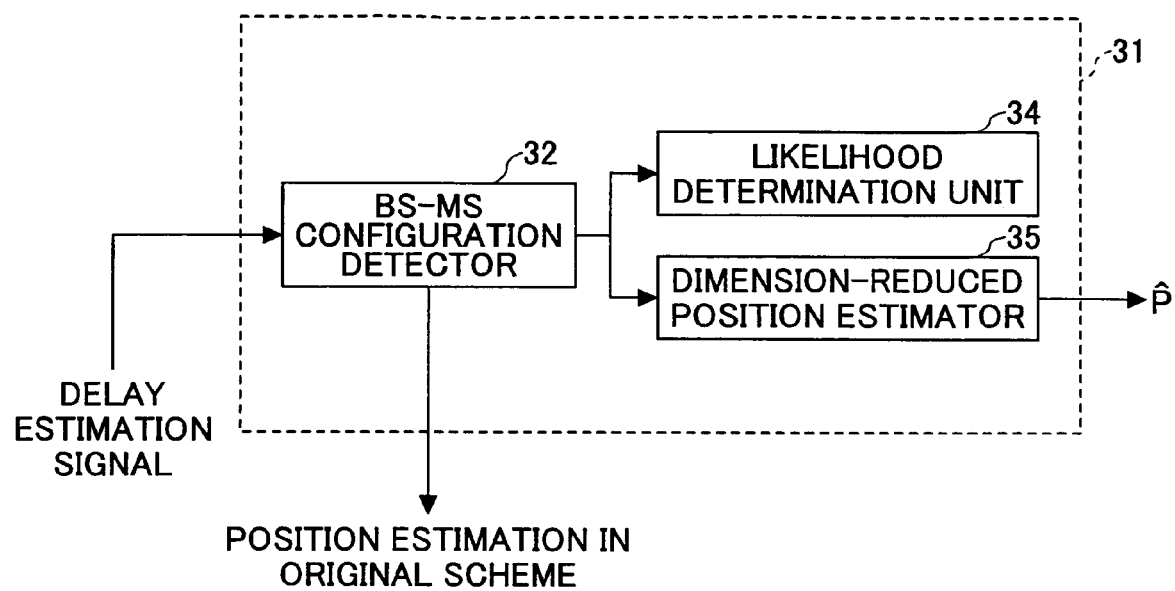
FIG. 9 is a schematic block diagram of the particular-geometry position estimator (second position estimator) used in the wireless positioning apparatus shown in FIG. 8.

FIG. 9 illustrates the structure of the particular-geometry position estimator (the second position estimator) 31. The particular-geometry position estimator 31 includes a BS-MS configuration detector 32, a dimension-reduced position estimator 35, and a likelihood determination unit 34. The BS-MS configuration detector 32 specifies the number and the locations of the BSs contributing to the current position estimation, based on the received signals input to the multipath delay estimator 11, and detects the topology or layout of the base stations and the mobile station. The BS-MS layout can be determined based on the past records, such as transition of the position estimates for this mobile station.

If the detected BS-MS layout is in either Case 1 or Case 2 described above, the dimension-reduced position estimator 35 estimates the location of the MS using the optimum positioning algorithm for the associated dimension. The likelihood determination unit 34 determines whether the likelihood of the estimation result of the dimension-reduced position estimator 35 satisfies a prescribed criterion. If the likelihood is satisfactory, the estimation result of the dimension-reduced position estimator 35 is output as the location information of the MS. For example, when the finite positioning error calculated by the dimension-reduced position estimator 35 is less than a prescribed threshold, it is determined that the estimation result is in the acceptable range. If the likelihood of the estimation result is insufficient (e.g., if the finite positioning error exceeds the threshold), the estimate is discarded.

On the other hand, if the BS-MS layout detected by the BS-MS configuration detector 32 is not in the particular geometry (either Case 1 or Case 2), the location of the MS is estimated by the position estimator 17, based on the original scheme described in the first embodiment using the MAP approach making use of useful delay estimates selected from the multipath delay profiles.

If the BSs and the MS are in a straight line (or in a plane in three-dimensional positioning), the BS-MS configuration detector 32 further determines whether the MS and each BS are in non-line-of-sight (NLOS). A dedicated NLOS determination unit (not shown in FIG. 9) may be provided in the BS-MS configuration detector 32, or alternatively, the NLOS determination unit 22 (see FIG. 3) of the selector 13 may be shared.

Figure 10:
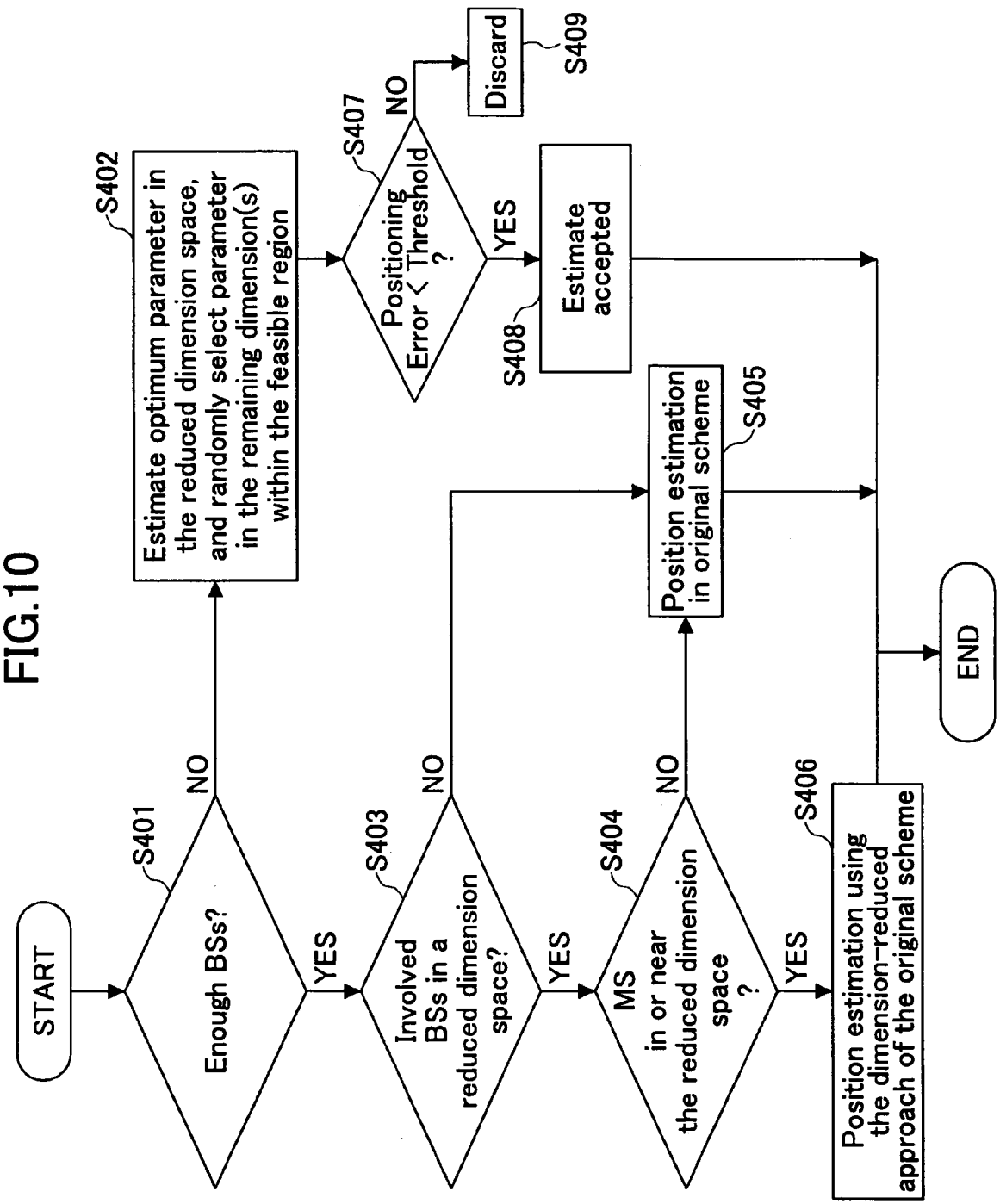
FIG. 10 is a flowchart of a wireless positioning method according to the third embodiment of the invention.

FIG. 10 is a flowchart showing the operation of the wireless positioning apparatus 30 according to the third embodiment. First, in step S401, it is determined by the BS-MS configuration detector 32 whether a sufficient number of BSs are available for the current position estimation, based on the received signals input to the multipath delay estimator 11. For two-dimensional positioning, the "sufficient number" means two or more BSs, such that two or more sets of multipath delay estimates can be obtained. In other words, if only a signal BS is available to derive multipath delay estimates, they are determined as being insufficient. For three-dimensional positioning, the "sufficient number" is three or more BSs. Accordingly, if only one or two BSs are involved, it is determined as being insufficient.

If there are not enough BSs (NO in S401), the BS-MS configuration is in the particular geometry, and the therefore the optimum parameter estimation in the available dimension (i.e., reduced dimension) is performed in step S402, while leaving the parameters in the rest of the dimension(s) to be randomly selected in the feasible region. For example, for two-dimensional positioning, position estimation is treated as the one-dimensional problem and the finite MMSEs are determined using Eq. (16) to produce the one-dimensional parameter $\rho$ or x. The remaining parameter in the rest of the dimension, e.g., $\theta$ or y, is set to an arbitrary value randomly selected in the feasible region. For three-dimensional positioning, the MMSEs are determined using Eq. (20) or Eq. (21), depending on the number of BSs, to produce the parameter(s) in the reduced (available) dimension(s). The remaining parameter(s) in the rest of the dimension(s) are randomly selected in the feasible region.

Then, the process proceeds to step S407 to determine whether the error is less than the prescribed threshold (depending on some service requirement). If the MMSE is less than the threshold with the variance $\sigma_1$ sufficiently small as compared with delay estimate $\tau_1$ (YES in S407), the estimation result is output as valid information in step S408. If the MMSE is at or above the threshold, the estimation result is discarded in step S409.

If there are enough BSs in S401, the process proceeds to step S403, and it is determined by the BS-MS configuration detector 32 whether the involved BSs are in a reduced dimension. Specifically, for a two-dimensional setting, it is determined whether the BSs are aligned on a straight line. For a three-dimensional case, besides the line check, it is determined whether the BSs are on a same plane. If the BSs are not in the reduced dimension space (NO in S403), the BS-MS layout (or configuration) is not in the particular geometry, and therefore, the original scheme of position estimation described in the first or second embodiment is employed to locate the MS position in step S405.

If the involved BSs are located in the reduced dimension space (YES in S403), the process proceeds to step S404 to further determine whether the MS is in the reduced dimension space or in its neighborhood, checking whether the MS is on or near the aligned line, or in or near the plane for three-dimensional positioning.

There are several approaches for determining whether the MS is on a straight line or a same plane as the BSs.

First, prior information is used. For example, in a position tracking scenario, the MS position at an earlier instant, as well as its speed and direction, are known. Based on such information, it can be predicted whether the MS should be treated as being in or near the reduced dimension space.

Second, unfeasible converging points can be used. Conventional positioning schemes would converge to some unfeasible points when the MS moves in or near the reduced dimension space. For example, when the converging point (position) produced by the current position estimation is an unrealistic one in view of the previously estimated position and the moving speed of the MS, it is considered that the MS is approaching the reduced dimension space.

Third, unreliable computation results may be used. This is especially for a positioning scheme adopting a gradient-based optimization technique. When iterative search steps for the optimum MS position estimate move into the neighborhood of the reduced dimension space, a related matrix inversion calculation would become unreliable (infinitely large) due to some extremely large elements.

If the MS is not in or near the reduced dimension space (NO in S404), the original scheme of position estimation is performed by the position estimator 17 in S405. Even if only two BSs are involved in two-dimensional positioning, the estimation result produced by the method of the first or second embodiment can take a finite value of Cramer-Rao lower bound (CRLB).

If the MS is in or near the reduced dimension space (YES in S404), the process proceeds to step S406, in which the dimension-reduced position estimator 35 performs position estimation, treating the problem as the lower-dimensional one. For two-dimensional positioning, the MS position is estimated as a one-dimensional problem using Eq. (18).

It should be noted that if the MS and the BS are non-line-of-sight (NLOS) in spite of their alignment, the original scheme of the position estimation is performed according to the first or second embodiment, depending on the synchronous or non-synchronous system. To this end, the step of NLOS determination may be inserted after S404.

With the wireless positioning apparatus 30 and the positioning method of the third embodiment, the location of a mobile station can still be estimated with a certain degree of accuracy even if the MS and BS(s) are in the particular geometry that generally does not allow position estimation in the conventional methods.

The present invention has been described based on specific embodiments; however, the invention is not limited to these examples. Many modifications or substitutions can be made by those skilled in the art within the scope of the invention defined by the appended claims.

This patent application is based on and claims the benefit of the earlier filing dates of Japanese Patent Applications No. 2004-171819 filed Jun. 9, 2004 and No. 2004-255916 filed Sep. 2, 2004, the entire contents of which are hereby incorporated by reference.

What is claimed is:

1. A wireless positioning method, comprising:
   estimating multipath delay components from each of a plurality of received signals;

selecting appropriate delay estimates from the multipath delay components to conform to a predeterminded criterion;

determining whether a mobile station and one or more involved base stations are in a particular geometry that can be reduced in a lower dimension space, the determining step including determining whether there are enough base stations for current estimation, and estimating an optimum parameter for the lower dimension space if there are not enough base stations, while leaving the parameter in a rest of the dimensions to be randomly selected in a feasible region other than an infeasible region or direction in which the mobile station is unlikely to be located;

estimating the position of the mobile station in the lower dimension space if the mobile station and the one or more involved base stations are in the particular geometry; and estimating a location of the mobile station based on the selected delay estimates and a non-line-of-sight (NLOS) delay function defining prior information of NLOS delays.

2. A wireless positioning apparatus, comprising:

a multipath delay estimator configured to estimate multipath delay components from one or more received signals;

a selector configured to select appropriate delay estimates from the estimated multipath delay components according to a predetermined criterion;

a storage configured to store a non-line-of-sight (NLOS) delay function defining prior information about NLOS delays; and a position estimator configured to estimate a position of a mobile station based on the selected delay estimates and the NLOS delay function read out from the storage, wherein the selector selects a line-of-sight (LOS) delay estimate of LOS propagation if there is one in the multipath delay components, and further selects NLOS delay estimates such that variances of those NLOS delay estimates are smaller than a first threshold and that the signal strength corresponding to those NLOS delay estimates is greater than a second threshold.

3. A wireless positioning apparatus, comprising:

a multipath delay estimator configured to estimate multipath delay components from one or more received signals;

a selector configured to select appropriate delay estimates from the estimated multipath delay components according to a predetermined criterion;

a storage configured to store a non-line-of-sight (NLOS) delay function defining prior information about NLOS delays;

a position estimator configured to estimate a position of a mobile station based on the selected delay estimates and the NLOS delay function read out from the storage; and a second position estimator configured to estimate the position of the mobile station in a reduced dimension space if the mobile station and involved base station(s) are in a particular geometry, wherein the selector selects a line-of-sight (LOS) delay estimate of LOS propagation if there is one in the multipath delay components, and further selects NLOS delay estimates such that variances of those NLOS delay estimates are smaller than a first threshold and that the signal strength corresponding to those NLOS delay estimates is greater than a second threshold.

4. A wireless positioning method, comprising:

estimating multipath delay components from each of a plurality of received signals;

selecting appropriate delay estimates from the multipath delay components so as to conform to a predetermined criterion; and estimating a location of a mobile station based on the selected delay estimates and a non-line-of-sight (NLOS) delay function defining prior information of NLOS delays, wherein the selecting step includes selecting a line-of-sight (LOS) delay estimate of LOS propagation if there is one in the multipath delay components, and further selecting NLOS delay estimates such that variances of the NLOS delay estimates are smaller than a first threshold and that the signal strength corresponding to the NLOS delay estimates is greater than a second threshold.

5. A wireless positioning apparatus, comprising:

estimating multipath delay components from each of a plurality of received signals;

selecting appropriate delay estimates from the multipath delay components so as to conform to a predetermined criterion;

determining whether the mobile station and one or more involved base stations are in a particular geometry that can be reduced in a lower dimension space;

estimating the position of the mobile station in the reduced dimension space if the mobile station and the involved base station(s) are in the particular geometry; and estimating a location of a mobile station based on the selected delay estimates and a non-line-of-sight (NLOS) delay function defining prior information of NLOS delays, wherein the selecting step includes selecting a line-of-sight (LOS) delay estimate of LOS propagation if there is one in the multipath delay components, and further selecting NLOS delay estimates such that variances of the NLOS delay estimates are smaller than a first threshold and that the signal strength corresponding to the NLOS delay estimates is greater than a second threshold.

* * * * *